(12) United States Patent
Fetner et al.

(10) Patent No.: US 8,714,175 B2
(45) Date of Patent: May 6, 2014

(54) PRESSURE RELIEF SYSTEM FOR PRESSURE VESSELS

(75) Inventors: Martin Fetner, Allentown, PA (US); Rolf Schlake, Nazareth, PA (US); Ernie Schlegel, Allentown, PA (US)

(73) Assignee: Applied Separations, Inc. PA (US)

( * ) Notice: Subject to any disclaimer, the term of this patent is extended or adjusted under 35 U.S.C. 154(b) by 369 days.

(21) Appl. No.: 13/034,104

(22) Filed: Feb. 24, 2011

(65) Prior Publication Data
US 2011/0203674 A1    Aug. 25, 2011

Related U.S. Application Data

(60) Provisional application No. 61/307,558, filed on Feb. 24, 2010.

(51) Int. Cl.
*F17D 1/00* (2006.01)
(52) U.S. Cl.
USPC ............. 137/1; 137/68.3; 137/244; 220/89.3; 222/83
(58) Field of Classification Search
USPC .................... 137/68.3, 1, 244, 242; 220/89.3; 222/83, 541.2
See application file for complete search history.

(56) References Cited

U.S. PATENT DOCUMENTS

| | | | |
|---|---|---|---|
| 1,921,411 A * | 8/1933 | Johann | 141/21 |
| 2,225,220 A | 12/1940 | Huff | |
| 2,370,870 A * | 3/1945 | McKeague | 220/89.2 |
| 3,753,336 A | 8/1973 | Drew et al. | |
| 3,872,874 A | 3/1975 | Nedelec et al. | |
| 3,922,767 A | 12/1975 | Solter et al. | |
| 4,046,280 A | 9/1977 | Hansen | |
| 4,079,854 A | 3/1978 | Shaw et al. | |
| 4,119,236 A | 10/1978 | Shaw et al. | |
| 4,269,214 A | 5/1981 | Forsythe et al. | |
| 4,363,418 A | 12/1982 | Matz | |
| 4,394,926 A | 7/1983 | Ou et al. | |
| 4,463,865 A | 8/1984 | Mundt et al. | |
| 4,580,589 A | 4/1986 | LeBras et al. | |
| 4,580,691 A | 4/1986 | Hansen | |
| 4,598,731 A * | 7/1986 | Colson | 137/318 |
| 4,723,687 A * | 2/1988 | Kutterer | 222/83 |
| 4,830,052 A | 5/1989 | Oberlin et al. | |
| 4,842,004 A | 6/1989 | Steinman | |

(Continued)

FOREIGN PATENT DOCUMENTS

| DE | 195 31 294 | 8/1996 |
|---|---|---|
| DE | 102 60 808 | 7/2004 |

(Continued)

*Primary Examiner* — Kevin Lee
*Assistant Examiner* — Macade Brown
(74) *Attorney, Agent, or Firm* — The Belles Group, P.C.

(57) ABSTRACT

A pressure relief system for depressurizing a bottled pressure vessel. In one embodiment, the system includes a pressure relief device having a hollow outer member coupled to a fluid port in the vessel and an inner member at least partially disposed in and movably supported by the outer member. The system may further include a rupture disk disposed in the port between the vessel interior and exterior. In operation, the outer member remains stationary while the inner member is advanceable therein towards the pressure vessel. In one embodiment, the inner member includes a piercing element which is projectable to penetrate the rupture disk and into the vessel interior through material deposits that may obstruct the fluid port thereby releasing captive pressure in the vessel.

23 Claims, 6 Drawing Sheets

(56) References Cited

U.S. PATENT DOCUMENTS

| | | | |
|---|---|---|---|
| 5,031,448 | A | 7/1991 | Saito |
| 5,076,312 | A | 12/1991 | Powell |
| 5,320,126 | A | 6/1994 | Krimm |
| 5,472,112 | A | 12/1995 | Maciejewski |
| 5,720,380 | A | 2/1998 | Graham, II |
| 5,979,477 | A | 11/1999 | Stillings |
| 6,240,948 | B1 | 6/2001 | Hansen, III et al. |
| 6,431,383 | B1 | 8/2002 | Mozley et al. |
| 6,494,074 | B2 | 12/2002 | Cullinane et al. |
| 6,948,515 | B2 | 9/2005 | Wadkins |
| 7,004,187 | B2 | 2/2006 | Hoffman |
| 7,308,903 | B2 | 12/2007 | Rooker et al. |
| 7,703,471 | B2 | 4/2010 | Edwards |
| 7,748,398 | B2 | 7/2010 | Miller |
| 2001/0006075 | A1 | 7/2001 | Muddiman et al. |
| 2001/0052358 | A1 | 12/2001 | Cullinane et al. |
| 2006/0016475 | A1 | 1/2006 | Hirota |
| 2006/0171861 | A1 | 8/2006 | Ross |
| 2008/0263951 | A1 | 10/2008 | Kobayashi |
| 2010/0024901 | A1 | 2/2010 | Sorensen |
| 2010/0096023 | A1 | 4/2010 | Widdas |

FOREIGN PATENT DOCUMENTS

| | | |
|---|---|---|
| EP | 0 005 931 | 12/1979 |
| EP | 0 010 913 | 5/1980 |
| EP | 0 400 818 | 12/1990 |
| EP | 2 249 069 | 11/2010 |
| GB | 2 126 281 | 3/1984 |
| GB | 2 201 464 | 9/1988 |
| GB | 2 224 077 | 4/1990 |
| GB | 2 462 425 | 2/2010 |
| JP | 402007817 | 1/1990 |
| JP | 402011977 | 1/1990 |
| JP | 403168476 | 7/1991 |
| JP | 405147490 | 6/1993 |
| JP | 405263955 | 10/1993 |
| JP | 406011059 | 1/1994 |
| JP | 407076255 | 3/1995 |
| JP | 408093940 | 4/1996 |
| JP | 408159314 | 6/1996 |
| JP | 410252915 | 9/1998 |
| JP | 02002350007 | 12/2002 |
| JP | 02005067570 | 3/2005 |
| JP | 08202635 | 9/2008 |
| JP | 02008213527 | 9/2008 |
| JP | 02008254502 | 10/2008 |
| JP | 02010018132 | 1/2010 |
| JP | 10144769 | 7/2010 |
| WO | WO 91/12451 | 8/1991 |
| WO | WO 93/23693 | 11/1993 |
| WO | WO 03/045739 | 6/2003 |
| WO | WO 03/089823 | 10/2003 |
| WO | WO 2004/018268 | 3/2004 |
| WO | WO 2010/125500 | 11/2010 |
| WO | WO 2010/129640 | 11/2010 |

* cited by examiner

PRESSURE RELIEF SYSTEM FOR PRESSURE VESSELS

CROSS REFERENCE TO RELATED APPLICATIONS

This present application claims the benefit of priority to U.S. Provisional Patent Application No. 61/307,558 filed Feb. 24, 2010, the entire contents of which are incorporated herein by reference.

FIELD OF THE INVENTION

The present invention generally relates to pressure vessels, and particularly to pressure vessels such as may be employed in supercritical fluid extraction systems.

BACKGROUND OF THE INVENTION

Supercritical fluid extraction systems use carbon dioxide ($CO_2$) at high pressure and high temperature, typically 10,000 psi and 150 C. These systems are environmentally benign and "green" since they generally do not rely on the use of sometimes toxic chemicals to extract a desired end product compounds from a starter matrix material. In its supercritical state, $CO_2$ has both gas-like and liquid-like qualities, and it is this dual characteristic of supercritical fluids that provides the ideal conditions for extracting compounds with a high degree of recovery in a short period of time.

A major component of supercritical fluid systems is a pressure vessel which contains the $CO_2$ and the matrix material including the desired end product compound which is being extracted. Under normal circumstances, the $CO_2$ is contained in the vessel by shut off valves on either end of the vessel. One valve is an inlet valve and one valve is an outlet valve, both of which are both fluidly coupled to corresponding inlet and outlet fluid ports on the vessel. The inlet valve opens and $CO_2$ enters the vessel. At a predetermined pressure, the inlet valve closes and traps the $CO_2$ inside the vessel. After some period of time, the outlet valve opens and the $CO_2$ and the extracted end product compound or component of the matrix rush out of the vessel. Then the outlet valve closes and the cycle is complete.

But there are occasions when this simple cycle may encounter a problem in evacuating the pressure vessel. There may be times that the extract has physical properties making it a gluey or sticky material like a polymer resin and this material coats the interior surfaces of the vessel. When an operator tries to open the outlet valve in such a case, the gluey extract material may block or plug the outlet port. The operator must then shuts down the equipment and tries to bleed the vessel pressure down through the inlet port by opening the inlet valve, but this port may also be similarly blocked by the gluey extract material. The operator now has a bottled vessel that may contain 10,000 psi $CO_2$ with no ready and reliable way to evacuate it in order to gain access to the vessel interior to remove the gluey extract.

Accordingly, an improved means to depressurize such pressure vessels under the foregoing conditions is desired.

SUMMARY OF THE INVENTION

Embodiments of the present invention provide a pressure relief system and associated method of use for accessing and relieving pressure from a bottled pressure vessel in situations where the normal inlet or outlet ports may become blocked, such as by a gluey or sticky extract material as described above or for other reasons. The pressure relief system further includes a means for lancing and penetrating the extract material such as a puncturing member to establish an egress point and fluid flow path to atmosphere for venting gas and/or liquid from the vessel thereby reducing the captive pressure therein. Once depressurized, the pressure vessel may be accessed to remove the extract material. Embodiments of the pressure relief system may further include a rupture disk disposed in the pressure vessel which provides a penetrable pressure boundary that may be selectively penetrated by the puncturing member as further described herein.

According to one embodiment, a pressure relief system is provided for depressurizing a pressure vessel having a rupture disk disposed in a fluid port extending through the vessel from interior to exterior. The system may include an elongated outer member having an axial central passageway. The outer member is configured to engage the fluid port for mounting thereto. In one embodiment, the outer member may be cylindrical in shape and threadably coupled to the fluid port. The system further includes an elongated inner puncturing member at least partially disposed in and movably supported by the outer member. The inner puncturing member is rotatably coupled to the outer member and axially moveable with respect to the outer member via rotating the inner puncturing member. The inner puncturing member further includes an elongated piercing element at least partially disposed in the central passageway of the outer member. The piercing element includes a tapered end configured for puncturing the rupture disk. In one embodiment, the piercing element is selectively projectable outwards from the outer member and operable to puncture the rupture disk. In a preferred embodiment, the piercing element is further operable to be projected through the fluid port into the interior of the pressure vessel via rotating the puncturing member to penetrate any material deposits that may obstruct the fluid port. In one embodiment, the fluid port may be a pressure relieving port. The piercing element is axially movable via rotating the puncturing member between a retracted position spaced apart from the rupture disk and an extended position projecting through and puncturing the rupture disk.

According to another embodiment of a pressure relief system for depressurizing a pressure vessel having a fluid port extending through the vessel from interior to exterior, the system may include a rupture disk assembly disposed in the fluid port and including a rupture disk, a hollow outer bolt having a shank threadably coupled to the fluid port, the outer bolt defining an axial central passageway extending from a proximal end to a distal end of the outer bolt, and an inner bolt having a shank threadably coupled to the central passageway of the outer bolt, the inner bolt being axially moveable with respect to the outer bolt via rotating the inner bolt, and an elongated piercing element protruding from the inner bolt and at least partially disposed in the central passageway of the outer bolt. The piercing element preferably has a tapered end which may have a pointed or sharpened tip configured for puncturing the rupture disk. The piercing element is selectively and axially movable via rotating the inner bolt between a retracted position spaced apart from the rupture disk and an extended position projected through the fluid port into the interior of the pressure vessel, wherein the puncturing element being operable to puncture the rupture disk by moving from the retracted position to the extended position. The tapered end of the piercing element may be either fully contained and concealed within or partially projecting outwards from the central passageway of the outer member when in the retracted position.

A method for depressurizing a pressure vessel is also provided. According to one embodiment, the method may include the steps of: mounting a nested bolt assembly to an elongated fluid port of a pressure vessel extending from interior to exterior of the vessel, the bolt assembly including a first hollow outer bolt having an axial central passageway and a concentrically aligned second inner bolt partially inserted therein; axially advancing the inner bolt through the outer bolt; puncturing a rupture disk disposed in the fluid port with an elongated piercing element mounted on the second bolt; and exhausting gas or liquid from the pressure vessel through the bolt assembly thereby reducing pressure within the pressure vessel. The method may further include a step of projecting the piercing element through the fluid port into an interior of the pressure vessel after the step of puncturing the rupture disk, wherein the piercing element is operable to penetrate material deposits that may be formed in the pressure vessel obstructing the fluid port.

BRIEF DESCRIPTION OF THE DRAWINGS

The features of the preferred embodiments will be described with reference to the following drawings where like elements are labeled similarly, and in which.

All drawings are schematic and not to scale, and should therefore be interpreted accordingly.

DESCRIPTION OF THE PREFERRED EMBODIMENTS

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. The term "configured" as used herein shall be interpreted to include both shape and dimension. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features; the scope of the invention being defined by the claims appended hereto.

In the description of embodiments of the invention disclosed herein, any reference to direction or orientation is merely intended for convenience of description and is not intended in any way to limit the scope of the present invention. Moreover, the features and benefits of the invention are illustrated by reference to preferred embodiments. Accordingly, the invention expressly should not be limited to such preferred embodiments illustrating some possible but non-limiting combination of features that may be provided alone or in other combinations of features; the scope of the invention being defined only by the claims appended hereto.

Figure 1A:
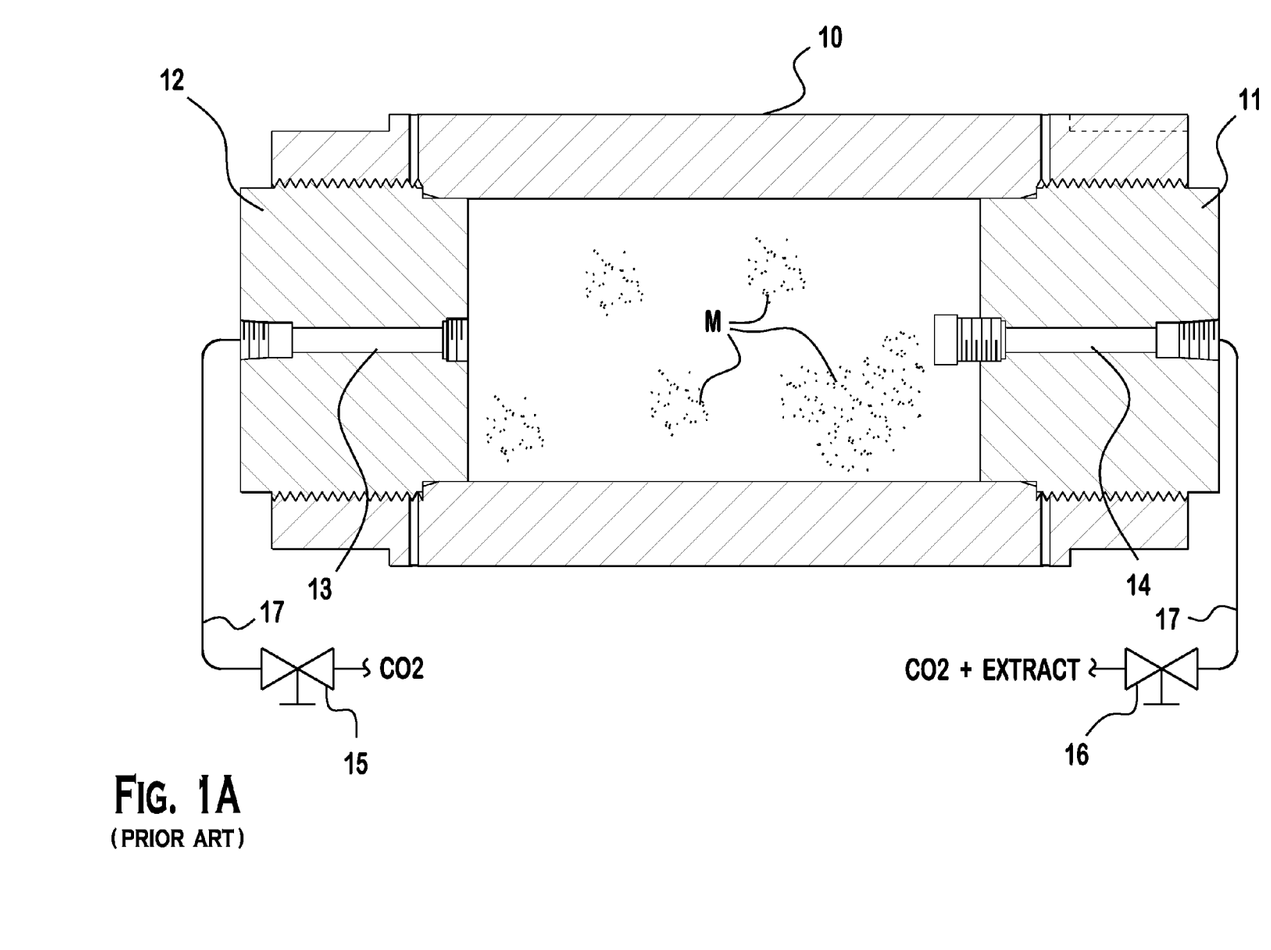
FIG. 1A is a cross-sectional side view of a conventional pressure vessel such as used without limitation in material extract processes.
Figure 1B:
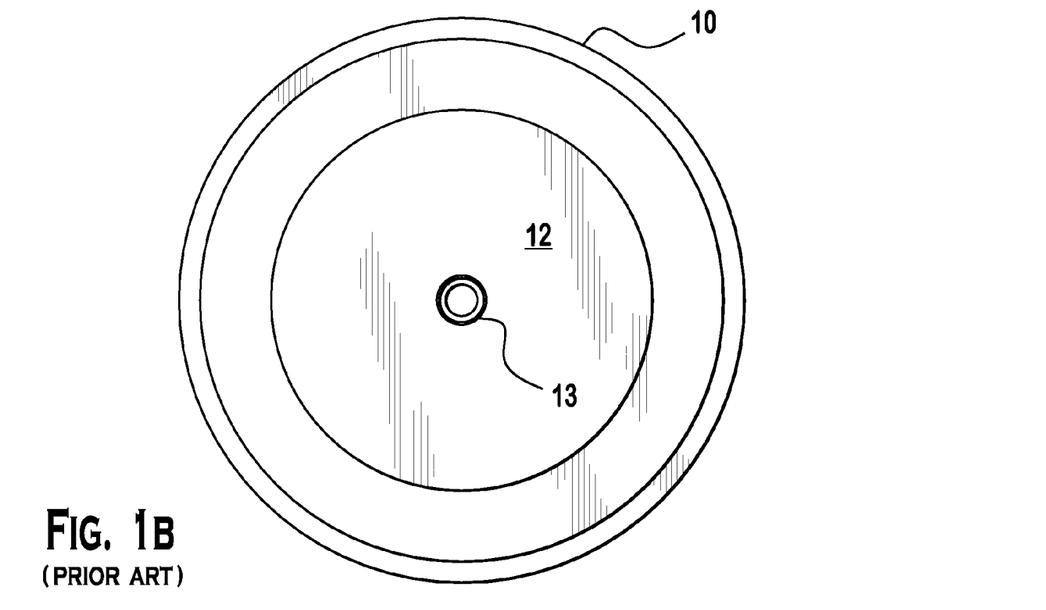
FIG. 1B is a end view of the pressure vessel of FIG. 1A showing the inlet port end and lid.

FIGS. 1A and 1B show a typical pressure vessel configuration which may be used for supercritical fluid extraction systems. In one embodiment, the vessel 10 is a thick walled steel or preferably stainless steel hollow cylinder (other high strength materials can be used) with a sealable and removable cap or lid 11, 12 disposed at either one end or both ends. The lids may be threadably attached to the ends of the vessel which have complementary threaded portions, or the lids may be affixed to the vessel by any other suitable means conventionally used in the art such as without limitation flanged ends. An inlet and outlet port 13, 14 each comprising elongated cylindrically shaped bores may be located at opposite ends of the vessel, which in the exemplary embodiment shown may be disposed in the end lids. In other embodiments, the ports can be located at other points or locations in the vessel. FIG. 1A shows a vessel with two lids 11, 12 and each lid has a single port 13, 14. The inlet and outlet ports 13, 14 extend completely through each respective lid 12, 11 and are fluidly coupled to the interior of the pressure vessel 10 which contains the matrix material M held under high pressure and temperature. This configuration is typical of a design which might incur the gluey extract problem described above in the "Background," in which the inlet and outlet ports are blocked by the extract (see, e.g. FIG. 1A).

As further shown in FIG. 1A, an inlet and outlet valve 15, 16 are typically provided as described herein which are coupled to the inlet and outlet ports via tubing or piping 17, respectively, for admitting $CO_2$ into the pressure vessel and removing $CO_2$ with the extracted component.

Figure 2:
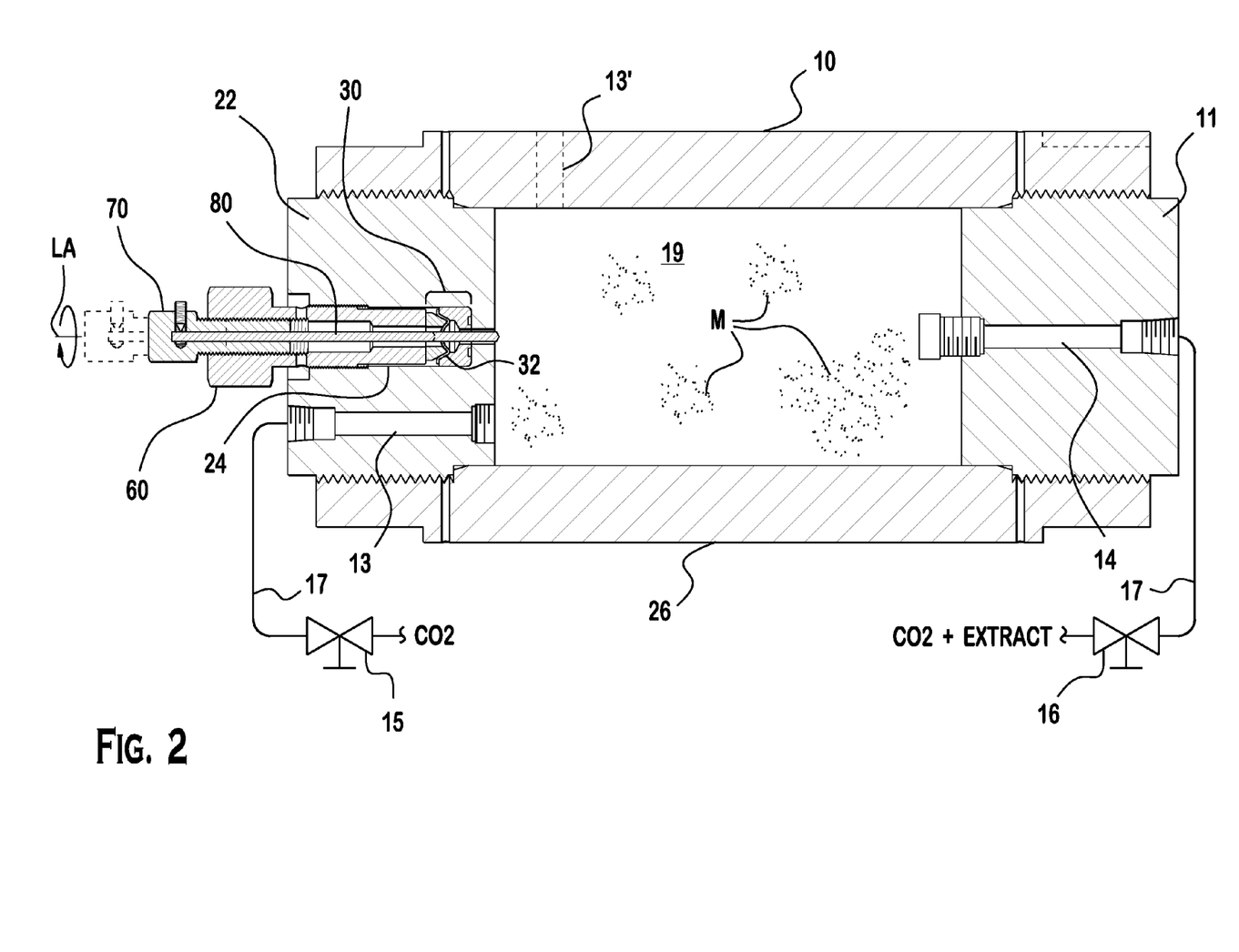
FIG. 2 is a cross-sectional side view of one embodiment of a pressure vessel with pressure relief system according to principles of the present invention.
Figure 3:
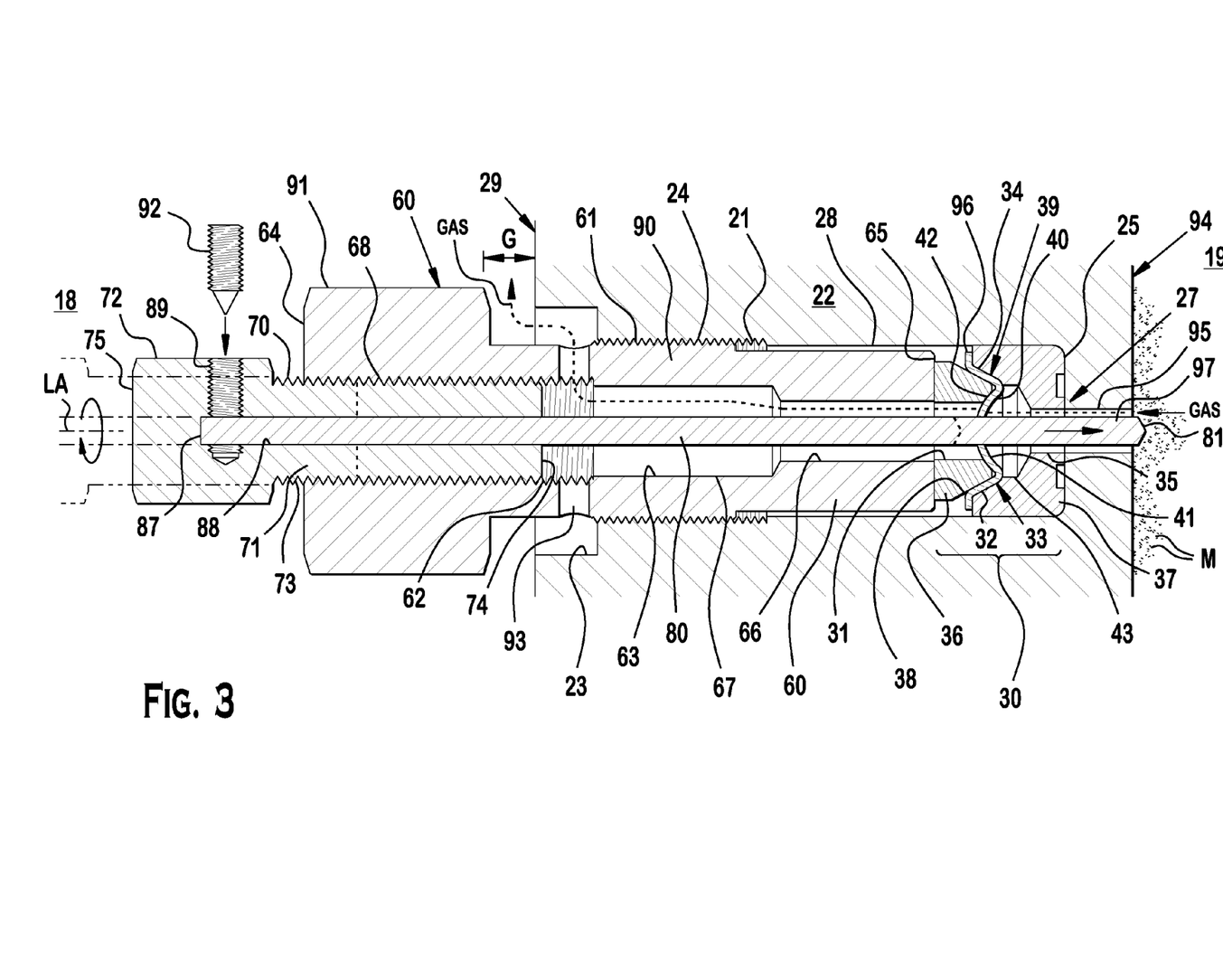
FIG. 3 is a close up cross-sectional side view of an end cap or lid showing the pressure relief system of FIG. 2 in greater detail.

FIG. 2 shows an exemplary embodiment according to the present invention of an improved pressure vessel 10 with pressure relief system 20 for controlled release of captive pressure from the vessel under unusual operating conditions where the gluey extract problem described herein is encountered. FIG. 3 shows an enlarged view of the pressure relief system in FIG. 2. The pressure vessel 10 shown in FIG. 1 may replace one or both end lids 11, 12 with the specially configured end lid 22 design shown in FIGS. 2 and 3. In this design embodiment shown, an additional fluid port such as pressure relieving port 24 is drilled and tapped into a lid 22 for pressure relief purposes. The conventional inlet port 13 may also be provided in the lid 22 in any suitable location in addition to pressure relieving port 24 in the same manner shown in FIG. 1A or in an alternate location, such as inlet port 13' disposed in the circumferential sidewall 26 of the pressure vessel 10 as shown in FIG. 2. Pressure relieving port 24 may be provided in an location on lid 22 such as on the axial centerline of the lid as shown or elsewhere. Accordingly, the invention is not limited by the locations selected for pressure relieving port 24 or inlet port 13. The pressure relieving port 24 extends completely through the lid 22 from the exterior 18 of the vessel 10 into the interior 19 wherein a chamber is formed for the matrix material M and CO2.

In one embodiment, as shown in FIGS. 2 and 3, the pressure relieving port 24 is preferably an elongated cylindrically-shaped bore having a circular cross-sectional shape and defining a longitudinal axis LA. As best shown in FIG. 3, port 24 may include a first larger diameter portion 28 having a first bore diameter starting from about exterior surface 29 of lid 22 and extending inwards toward pressure vessel 10, and a second reduced diameter portion 95 having a second bore diameter smaller than the first diameter and extending from the interior surface 94 of the lid outwards to adjoin with portion 28. Reduced diameter portion 95 is shorter than first portion 28 which is dimensioned to receive shank 90 of outer bolt 60 therein. A stepped portion 27 is formed between the first and second portion 28, 95 which defines a generally flat annular seating surface 25 for seating a rupture disk assembly 30 as further described herein. The first portion 28 preferably has a first diameter sized for accommodating a standard size rupture disk 32. It should be noted that in other embodiments contemplated, the pressure relieving port 24 may have a substantially constant diameter wherein the first and second portions 28, 26 may have the same diameter. The bore of the pressure relieving port 24 has an axial length greater than the diameter of the bore, and preferably substantially greater. In some embodiments, the bore length of port 24 may be preferably at least twice the diameter of the port.

With continuing reference to FIGS. 2 and 3, the pressure relief system 20 includes a rupture disk assembly 30 disposed in the pressure relieving port 24 preferably proximal to the interior side of the lid and between the exterior 18 and interior 19 of the vessel 10. A rupture disk 32 is generally a small disk of sheet metal that may be scribed or indented in some embodiments to burst at a calibrated relief pressure. It is normally used to protect a vessel from going over pressure. The rupture disk 32 shown has an outer annular seating flange 34 that is fixedly but removably compressed between a separable outer supporting member 36 and inner supporting member 37 that in some embodiments may define an angled annular surface or seat 38 for receiving the disk seating flange 34. In one embodiment, the seating flange 34 of the rupture disk 32 may include a complementary angled surface 39 for engaging the annular seat 38 of the inner member 37. In some representative embodiments, the angle of seating flange 34 may be without limitation about and included 30 degrees to about and included 45 degrees. Seating flange 34 of rupture disk 32 may therefore be frusto conical in shape in some embodiments with a rupturable curved or dome-shaped central portion 40 disposed at a location where the cone converges as shown. The seating flange 34 of the rupture disk 32 may further be configured to include an outward flared straight outer annular rim 96 adjoining angled surface 39 for engaging a complementary configured straight or flat annular surface of the inner member 37 as shown to assist with properly positioning and centering the rupture disk on the inner member.

The outer member 36 of the disk assembly 30 may include a mating angled annular surface 33 which is angled to complement the angle of the annular surface or seat 38 of the inner member 37 such that the annular seating flange 34 of the rupture disk 32 is sandwiched or compressed therebetween for retaining the disk in the assembly.

In some embodiments, without limitation, inner and outer supporting members 37, 36 are preferably made of any suitable metal such as steel, stainless steel, titanium, etc. In one preferred embodiment, supporting members 37, 36 may be made of stainless steel.

With continuing reference to FIGS. 2 and 3, the inner and outer members 37, 36 of the rupture disk assembly 30 each have centrally located apertures 35, 31 respectively which allow the piercing element 80 and outflow of CO2 or other gas from the pressure vessel 10 to pass through the assembly (see, e.g. FIG. 3). Inner and outer members 37, 36 preferably are circular in shape (viewed along longitudinal axis LA) to complement and fit the cylindrical shaped bore of pressure relieving port 24.

In alternative possible embodiments, seating flange 34 of rupture disk 32 may have a conventional flat or straight profile in lieu of being angled as shown in FIG. 3 (see, e.g. annular flange 12 of U.S. Pat. No. 6,341,383 which is incorporate herein by reference). In such embodiments, a flat seating flange 34 therefore would be oriented perpendicular to longitudinal axis LA, and annular seat 38 of inner supporting member 37 and mating annular surface 33 of outer supporting member 36 would both be similarly flat and oriented perpendicular to longitudinal axis LA to compress the seating flange of the rupture disk 32 therebetween. Accordingly, the seating flange 34 of rupture disk 32 is not limited to the possible angled embodiment shown herein.

It should be noted that the rupture disk assembly 30, including rupture disk 32, outer member 36, and inner member 37, is a stand alone assembly that is removably separable from lid 22 and bolt assembly 50. The disk assembly 30 may therefore be installed by inserting the assembly into pressure relieving port 24 from the exterior of lid 22 through the larger diameter first portion 28 of port 24, and removed therefrom in a similar manner.

With continuing reference to FIGS. 2 and 3, the rupture disk 32 includes rupturable curved or dome-shaped central portion 40 disposed inside of the outer seating flange 34. In conventional fashion, the domed central portion 40 has a concave surface 41 and adjacent convex surface 42 formed on opposite sides of the rupture disk 32. In the embodiment shown, however, for purposes of the present invention to be further described, the disk assembly 30 is preferably mounted with rupture disk 32 inverted from its normal orientation used in pressure vessels for relieving excessive pressures. Accordingly, the rupture disk 32 in this instance is oriented with the concave surface 41 of the domed central portion 40 facing inwards towards the interior 19 of the pressure vessel 10 and the adjacent convex surface 42 facing outwards. This orientation is intended to prevent the disk 32 from bursting from internal pressure within the pressure vessel 10 since the purpose of the disk is to provide an expendable egress point for gas from the pressure vessel interior 19 as further described herein. The rupture disk 32 preferably is structured and rated to hold a pressure well above the peak vessel rating without rupturing. It should be understood that the rupture disk employed in exemplary embodiments of the present invention described herein is distinct from conventional applications intended to prevent overpressurization of the pressure vessel. Accordingly, the rupture disk 32 is intended to be punctured and ruptured when intentionally penetrated by piercing element 80 as further described herein, not by excess pressure within pressure vessel 10.

Although rupture disk 32 is preferably oriented with the concave surface 41 facing towards the pressure vessel 10, the rupture disk may alternatively be oriented with the concave surface facing away from the pressure vessel so long as the disk is structured and rated not to fail under excess pressure within the vessel.

In a preferred exemplary embodiment, as best shown in FIG. 3, the inner and outer supporting members 37, 36 of the rupture disk assembly 30 define an enlarged chamber 43 disposed near the interior side or surface of the lid towards the interior 19 of the pressure vessel 10 to hold a standard size rupture disk. Accordingly, chamber 43 is radially enlarged in contrast to apertures 31 and 35 of outer and inner supporting members 36, 37, respectively which have comparatively smaller diameters than chamber 43. This is intended to improve the flow transition from diametrically smaller aperture 35 of rupture disk inner supporting member 37 to larger diameter aperture 31 of outer supporting member 36 (see FIG. 3).

With reference now to FIGS. 2-5, the pressure relief system 20 further includes a puncturing or lancing apparatus, which in one embodiment without limitation may be a two-piece threaded bolt assembly 50 which is mountable to the end lid 22 of the pressure vessel 10. Bolt assembly 50 is concentrically aligned with and positioned in pressure relieving port 24. When deployed, the bolt assembly 50 is operative to both puncture rupture disk 32 and importantly access the interior of the pressure vessel 10 to relieve the contained or bottled pressure when gluey or sticky extract material is encountered. The bolt assembly 50 includes a generally cylindrical first hollow outer bolt 60 and a generally cylindrical second inner bolt 70 that is supported by and threadably received at least partially inside the first bolt in one embodiment. The hollow outer bolt 60, which provides a mounting base member for bolt assembly 50, preferably remains stationary once secured and mounted to the lid 22. The inner bolt 70, as further described herein, provides a second rotary-operated puncturing member that is axially movable in position in relation to the outer bolt 60 and the lid 22 by rotating the bolt 70 via the threaded engagement between the inner and outer bolt.

The hollow cylindrically-shaped outer bolt 60 is received at least partially inside the pressure relieving port 24 formed in the end lid 22 as shown in FIGS. 2 and 3. In a preferred embodiment, the hollow bolt 60 may be removably secured to the lid 22 via a threaded attachment. A threaded attachment is preferably provided for rotatably coupling or mounting outer bolt 60 to lid 22 so that the bolt assembly 50 may be readily removed to access and replace the expendable rupture disk 32 after the pressure relief system has been actuated.

In the preferred embodiment, the hollow outer bolt 60 includes both external threads 61 and internal threads 62 tapped into the surfaces of an axially extending interior central passageway 63 that extends completely through the hollow bolt from an open proximal end 64 to an open distal end 65 as shown (best shown in FIG. 3). The external threads 61 screw into and engage complementary mating threads 21 provided in the lid 22, and more particularly provided on at least a portion of the pressure relieving port 24 in the lid.

Figure 4:
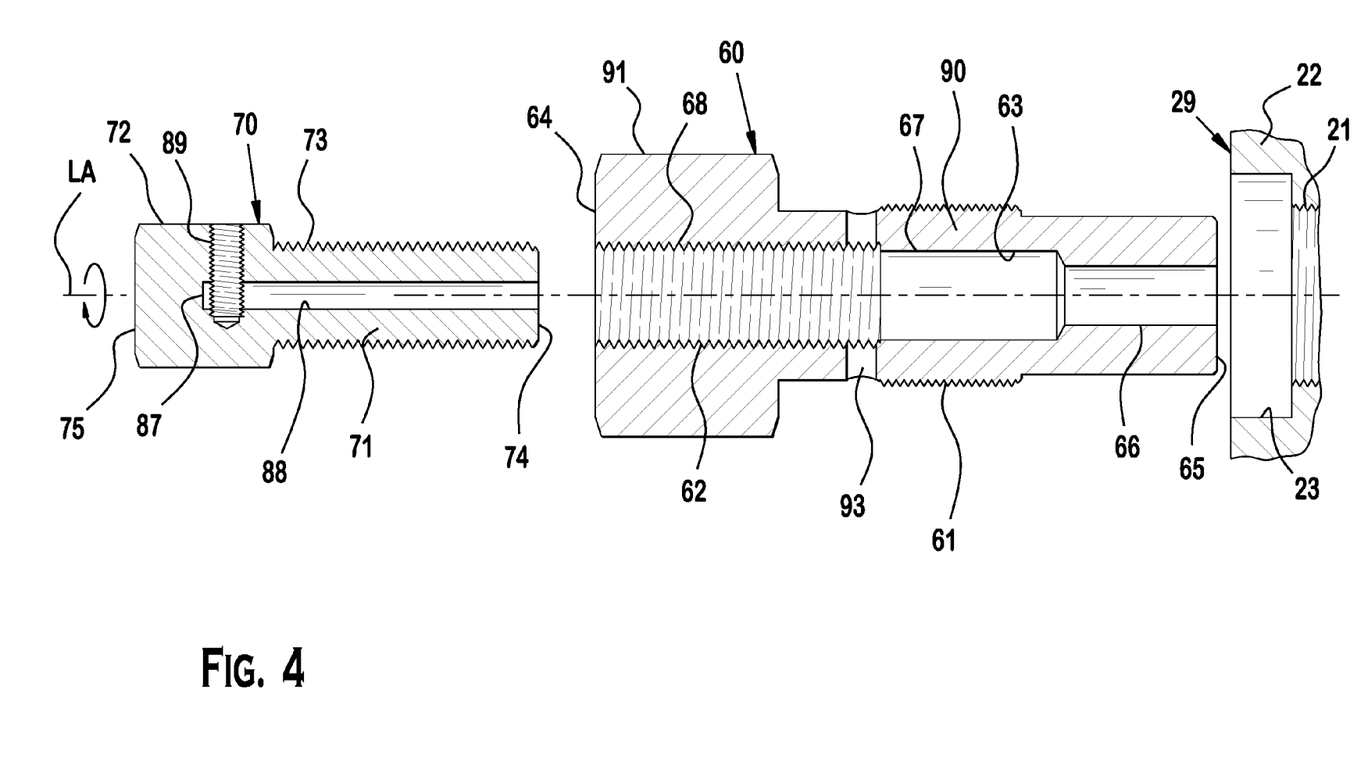
FIG. 4 is an exploded cross-sectional side view of the bolt assembly of FIGS. 2 and 3 disembodied from the pressure vessel.
Figure 5:
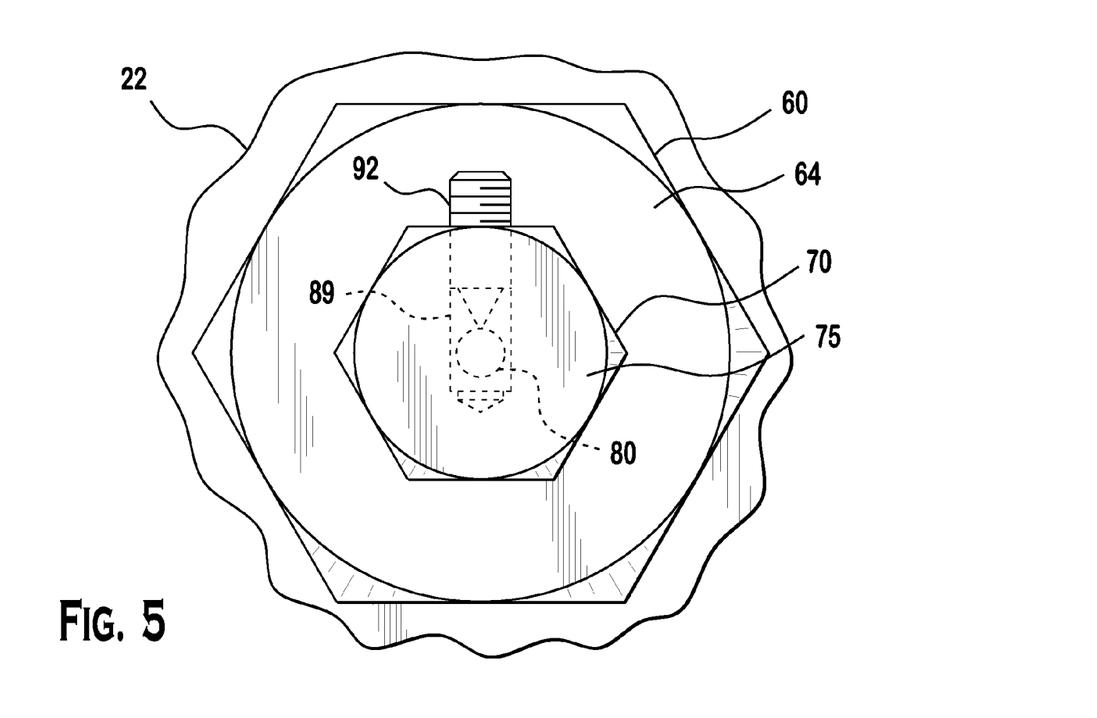
FIG. 5 is an end view of the pressure relief system of FIG. 3.

In preferred embodiments, the axial central passageway 63 may have a circular cross-section, and may contain sections having different cross-sectional diameters (best shown in FIG. 3) with a reduced diameter section 66 disposed in a distal end 65 portion of the hollow outer bolt 60 near the rupture disk assembly 30, a relatively larger diameter intermediate section 67 adjacent thereto, and a still larger diameter section 68 disposed in a proximal end 64 portion sized and configured to removably receive the shank 71 of inner bolt 70 therein (see FIGS. 2-4). In other possible embodiments, central passageway 63 may have a substantially uniform diameter from end to end.

In the exemplary embodiment shown in FIGS. 2 and 3, the distal end 65 of the hollow outer bolt 60 serves the purpose of also retaining the rupture disk assembly 30 in place within pressure relieving port 24 near the interior side of the lid 22 towards the pressure vessel 10. Outer bolt 60 therefore resists the internal pressure within pressure vessel 10 which acts on rupture disk 32 (before being punctured by inner bolt 70) located in the pressure relieving port 24. In other embodiments contemplated, however, the rupture disk assembly 30 may be retained in the lid by separate means (not shown). When the hollow outer bolt 60 is fully screwed into the lid 22, the distal end 65 of the hollow bolt engages the top of the outer supporting member 36 of the rupture disk assembly 30 and compresses the entire assembly against the stepped portion 27 and surface 25 of the pressure relieving port 24 as best shown in FIG. 3.

With continuing reference to FIGS. 2-5, the hollow outer bolt 60 includes a cylindrical shank 90 configured and dimensioned to be received into the pressure relieving port 24 and an adjoining operating head 91 intended to remain outside the end lid to which the hollow bolt is mounted. Threads 61 on outer bolt 60 for removably mounting the outer bolt to lid 22 are preferably disposed on at least a part of shank 90. In a preferred embodiment, the head 91 may be configured as a conventional hex nut that allows the hollow outer bolt to be screwed into the end lid 22 with a complementary configured tool such as a manual hex wrench or power socket driver by a user or operator.

Referring to FIGS. 2 and 3, the hollow outer bolt 60 further includes at least one, but preferably at least a pair of diametrically opposed venting ports or holes 93 which fluidly communicate with the axial passageway 63 therein and are operative to exhaust or vent the captive pressure and $CO_2$ released from the pressure vessel 10 as further described herein. In one exemplary embodiment, the venting holes 93 extend radially outwards from and transverse to the axial passageway 63 of the hollow outer bolt 60. In other possible embodiments, the venting holes 93 may be disposed at an angle to axial passageway 63 other than about 90 degrees as presently shown. In the preferred embodiment, the venting holes further fluidly communicate with a circular shaped annular venting recess 23 formed into the exterior surface 29 of the end lid 22. Preferably, the hollow outer bolt 60 is configured and dimensioned such that when the hollow outer bolt is fully screwed and seated into the lid 22, a gap G is provided between the head 91 of the outer bolt and exterior surface 29 of the lid as best shown in FIG. 3. This provides a pathway for the escaping $CO_2$ or other gas when the pressure relief system 20 is deployed and activated. Advantageously, the venting holes 93 and recess 23 are cooperatively configured to vent or exhaust the $CO_2$ or other gas radially outwards from the hollow outer bolt 60 so that the exhaust is not directed towards a user activating the pressure relief system.

Although the embodiment shown in FIGS. 2 and 3 has two venting holes 93, other embodiments contemplated may instead have one venting hole, or three or more holes depending on the speed with which the pressure vessel 10 is to be depressurized. In one preferred embodiment, four diametrically opposed venting holes 93 are provided. Accordingly, the invention is not limited to any particular the number of venting holes 93 that may be furnished.

Referring to FIGS. 2-5, cylindrically shaped inner bolt 70 includes a shank 71 defining a distal end 74 and an adjoining enlarged operating head 72 defining a proximal end 75. Shank 71 preferably has a shank diameter smaller than shank 91 so that shank 71 may fit inside axial central passageway 63 in the outer bolt 60. In one embodiment, at least part of shank 71 includes threads 73 which are complementary configured to mate with threads 62 disposed in central passageway 63 in the outer bolt 60 for rotatably coupling the inner bolt 70 to the outer bolt. Rotating inner bolt 70 will therefore axially move the inner bolt towards or away from the pressure vessel 10 depending on the direction of rotation.

Referring to FIGS. 2-4, the interior thread 62 formed on the first hollow outer bolt 60 in the axial passageway 63 allows the second threaded inner bolt 70 to be screwed into the hollowed out larger bolt. The inner bolt 70 is therefore preferably axially movable in relation to the outer bolt 60. Preferably, the shank 71 of the inner bolt has a length selected that will not obscure the venting holes in the hollow outer bolt 60 when the inner bolt is fully screwed into the outer bolt as best shown in FIG. 3. This keeps the central axial passageway 63 of the outer bolt open to at least the point where the venting holes 93 are located so the outgoing flow path for the CO2 or other gas is not blocked. In a preferred embodiment, the head 72 of the inner bolt 70 may be configured as a conventional hex nut that allows the inner outer bolt to be screwed into the outer bolt with a hex wrench or socket by a user or operator.

Referring to FIGS. 2-5, the inner bolt 70 includes an axially oriented piercing element 80 having a working end 97 which in some embodiments may be tapered having a generally pointed tip 81 configured for puncturing the rupture disk 32. In some embodiments, piercing element 80 preferably has an elongated and generally cylindrical shape from end to end. The piercing element 80 is cantilevered and protrudes from forward end 74 of shank 71 of the inner bolt 70 as shown projecting towards the rupture disk 32 and pressure vessel 10 when the inner bolt is mounted in the hollow outer bolt 60 on lid 22. Inner bolt 70 functions as an axially moveable carrier for piercing element 80. The piercing element 80, including tip 81, is therefore axially moveable within central passageway 63 of outer bolt 60 in both forward and rearward directions with respect to the outer bolt 60, rupture disk 32, and pressure vessel 10 via rotating inner bolt 70 in opposing directions.

Figure 6:
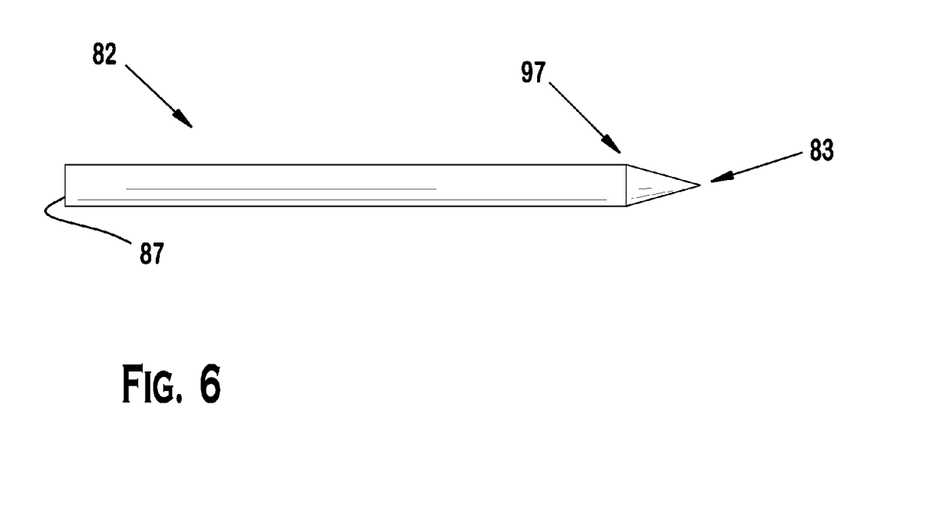
FIGS. 6 and 7 are side views of two possible embodiments of a piercing element shown in FIGS. 2-4.
Figure 7:
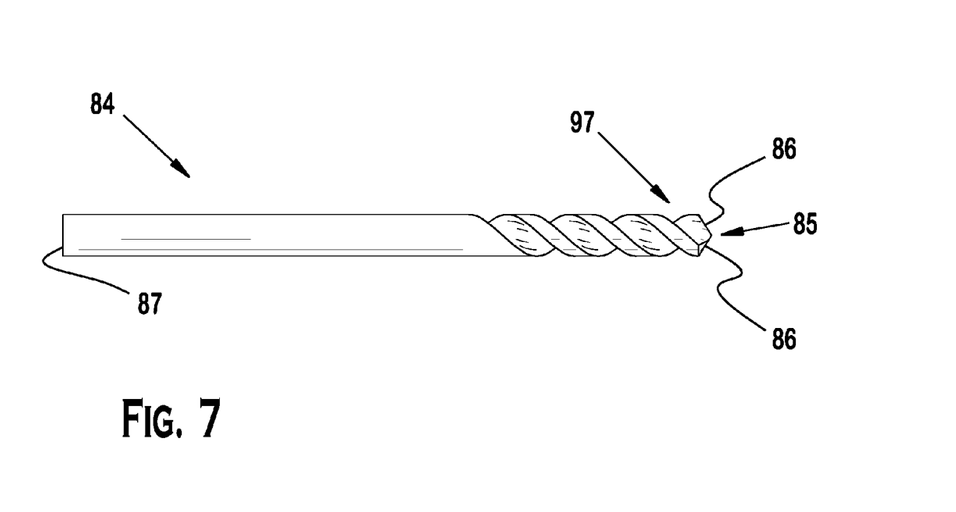

In some exemplary embodiments, without limitation, the piercing element 80 may be a cylindrically shaped spike 82 as shown in FIG. 6 having a pointed tip 83 on one end and an opposite mounting end 87, or piercing element 80 may be a conventional fluted drill bit 84 as shown in FIG. 7 having a pointed tip 85 on one end with adjoining cutting surfaces 86 and an opposite mounting end 87. Since inner bolt 70 is axially advanced within outer bolt 60 simultaneously with rotating the inner bolt, fluted drill bit 84 will operate in a conventional rotational manner to gradually drill and cut through rupture disk 32. If a power driver is used to rotate inner bolt 70, the inner bolt will axially advance relatively quickly and the drilling action of drill bit 84 will rapidly penetrate the rupture disk 32. Any form or configuration of a piercing element 80, however, may be used so long as the element has an end configured and operable to puncture the rupture disk and penetrate the gluey extract material M blocking pressure relieving port 24 in lid 22 on pressure vessel 10.

In some embodiments, as shown in FIGS. 2 and 3, the piercing element 80 may be removably retained in the inner bolt 70 in which a mounting portion or end 87 of the piercing element opposite the tip 81 is held in an axial bore 88 extending longitudinally through shank 71 and partially into head 72 of the inner bolt. The piercing element 80 may have an unthreaded plain shaft between ends 87, 97 and be retained in the inner bolt 70 via a conventional set screw 92 inserted radially and laterally through and engaging a threaded radially extending hole 89 in the head 72 of the inner bolt. Alternatively, in other possible embodiments contemplated, axial bore 88 of inner bolt 70 may be threaded for engaging complementary threads that may be formed on the shaft of piercing element 80 (not shown). Preferably, the piercing element 80 including preferably the working end 97 including tip 81 is dimensioned to have a smaller diameter than the diameter of the central axial passageway 63 in the hollow outer bolt 60 to create a flow path or conduit therebetween for evacuating CO2 or other gas from the pressure vessel as further described herein. In embodiments wherein the inner bolt 70 has a piercing element 80 in the form of a fluted drill bit 84 (see FIG. 7), a spiral/helical shaped void formed by the fluting creates an additional gas venting passage leading to the exterior of the lid 22 and pressure vessel 10.

In other embodiments, piercing element 80 may be an irremovable constituent or permanent part of a monolithic-structured inner bolt 70 wherein the head 72, shank 71, and piercing element 80 are made from a single piece of material that is machined or otherwise formed to configure each part.

As further described herein, the piercing element 80 is movable with the inner bolt 70 from a retracted axial position (shown in dashed lines) in which the piercing element has not pierced the rupture disk 32 to an extended axial position (shown in solid lines) in which the piercing element pierces the rupture disk and further may be projected into the interior 19 of the pressure vessel through the opening leading to pressure relieving port 24 for penetrating the gluey or sticky extract coating, as shown in FIGS. 2 and 3.

As shown in FIGS. 2-4, piercing element 80 (including the spike 82 and drill bit 84 embodiments shown in FIGS. 6-7) may have a substantially uniform diameter from mounting end 87 to tip 81 as shown. Accordingly, the working end 97 of piercing element 80 including tip 81 may have approximately the same diameter as the intermediate shaft of element 80 between the ends 87 and 97. Piercing element 80 including tip 81 is therefore fully insertable through both rear proximal end 64 and front distal end 65 of outer bolt 60 as best shown in FIG. 3. When installing piercing member 80, the piercing element may therefore be inserted through the proximal end 64 of outer bolt 60 (with shank 71 of the inner bolt 70) through central passageway 63 until tip 81 is disposed proximate to or projects slightly forward from distal end 65 of the outer bolt. In reverse fashion, tip 81 of piercing element 80 may be fully retracted into outer bolt 60 through distal end 65 into passageway 63.

In some exemplary embodiments, the bolt assembly 50 (i.e. outer bolt 60 and inner bolt 70) is preferably made of any suitable metal such as without limitation, steel or steel alloys including stainless steel, titanium, etc. In one embodiment, stainless steel is used. Piercing element 80 is also preferably also made of a suitable metal such as without limitation steel, stainless steel, titanium, etc. Inner and outer supporting members 37, 36 and rupture disk 32 of the rupture disk assembly 30 are preferably made of a suitable metal such as without limitation steel, stainless steel, titanium, etc.

Dimensionally, in one representative embodiment illustrated by way of the following which are all given merely as non-limiting examples with reference to FIG. 3, end lid 22 may have a total thickness (measured along longitudinal axis LA) of about 2.5 inches (pressure relieving port 24 accordingly has an equal length). For this size end lid 22, outer bolt 60 may have a length of about 3 inches from end to end and inner bolt 70 may have a greater length of about 3.75 inches from proximal end 75 on head 72 to the distal tip 81 of piercing element 80 (see, e.g. FIGS. 3 and 4). Preferably, outer bolt 60 has a greater length than the thickness of lid 22, and inner bolt 70 has a greater length than outer bolt 60 so that the inner bolt with piercing element 80 may be retracted and inserted into interior 19 of pressure vessel 10 as described herein. Outer bolt 60 may have a shank diameter of about 0.41 inches with a central passageway of about 0.25 inches and inner bolt 70 may have a shank diameter of about 0.19 inches with piercing element 80 having a diameter of about 0.16 inches. In this arrangement, with respect to pressure relieving port 24, the smaller reduced diameter portion 95 of end lid 22 may have a bore diameter of about 0.32 inches and the larger diameter portion 28 may have a bore diameter of about 0.52 inches. Reduced diameter portion 95 may have a length of about 0.19 inches. It will be appreciated that any suitably dimensions may be used so long as the functionality of the pressure relief system 20 as described herein is maintained. Accordingly, the invention is expressly not limited by the foregoing illustrative dimensions.

A method of operating the pressure relief system for an extraction pressure vessel will be now described with primary reference to FIGS. 2 and 3. As an initial step, the rupture disk assembly 30 is first inserted fully into pressure relieving port 24 preferably until seated against stepped portion 27 as shown.

The bolt assembly 50 including the inner and outer bolts 70, 60 (see also FIG. 4) as described herein is provided either assembled or disassembled together. At least the hollow outer bolt 60, which provides a support base for inner bolt 70, is next mounted to end lid 22 of pressure vessel 10. This step is performed by rotating and screwing outer bolt 60 into the at least partially threaded pressure relieving port 24 in the end lid 22, either with or without the inner bolt 70 already inserted therein. Preferably, outer bolt 60 is axially advanced in pressure relieving port 24 until fully seating against and snugly abutting rupture disk assembly 30 as shown in FIG. 3. This retains the rupture disk assembly 30 in place wherein the outer bolt 60 compresses the rupture disk 32 between outer and inner supporting members 36, 37. The user may employ any appropriate tool such as a wrench or socket driver to rotate and advance outer bolt 60 into pressure relieving port 24 via engaging the tool with head 91 of the outer bolt.

If not already mounted, inner bolt 70 is then installed next in outer bolt 60 which is mounted in a stationary manner on end lid 22 as shown in FIGS. 2 and 3. Inner bolt 70 is installed by rotating and engaging the inner bolt in a first rotational direction to engage threads 73 with mating threads 62 in central passageway 63 of outer bolt 60. This axially advances the inner bolt 70 towards the pressure vessel 10 in pressure relieving port 24. Before the pressure relief system 20 is activated and deployed, the inner bolt 70 is preferably only partially screwed into the outer bolt 60 far enough as shown so that the tip 81 of the piercing element 80 is in a retracted axial position spaced apart from and preferably not contacting or penetrating the rupture disk 32 (see FIG. 3 showing dashed forward end 74 and head 72 of inner bolt 70 and dashed piercing element depicting the retracted position). Piercing element 80 may be fully withdrawn into or partially protruding forward from outer bolt 60 and central passageway 63 as shown in FIGS. 2 and 3. The inner bolt 70 need only be screwed into the outer bolt 60 and axially advanced far enough to hold it in place until the piercing element 80 is deployed. The user may employ any appropriate tool such as a wrench or socket driver to rotate and advance inner bolt 70 in outer bolt 60 via engaging the tool with head 72 of the inner bolt.

To activate the pressure relief system 20, a user or operator next continues to rotate the inner bolt 70 (with forward protruding piercing element 80) in the first rotational direction thereby simultaneously axially advancing the inner bolt farther into the stationary hollow outer bolt 60 and towards pressure vessel 10 (see FIGS. 2 and 3 and directional motion arrows). It should be noted that piercing element 80 is provided with both axial and rotating motion by inner bolt 70. The inner bolt 70 and piercing element 80 continues to advance axially towards rupture disk 32 and reduced diameter portion 95 of pressure relieving port 24 opening into the interior 19 of pressure vessel 10. Eventually, the tip 81 of the piercing element 80 engages and punctures or penetrates the rupture disk 32, which in some embodiments as shown may be spaced apart from the interior surface 94 of the end lid 22 facing the pressure vessel 10. This may relieve any captive pressure between the rupture disk 32 and pressure vessel 10; however, $CO_2$ will not be released from pressure vessel 10 until matrix material M obstructing pressure relieving port 24 is pierced by piercing element 80. Accordingly, after puncturing the rupture disk, 32, the user next continues to rotate and axially advance inner bolt 70 inwards towards pressure vessel 10 in the same first rotational direction until the tip 81 of the piercing element 80 enters and projects into the interior 19 of pressure vessel 10 from pressure relieving port 24 and penetrates through any gluey or sticky extract material M lining the inside of the vessel and interior surface 94 of end lid 22 blocking the pressure relieving port (best shown in FIG. 3). This corresponds to the extended position of inner bolt 70 and piercing element 80 as shown by the solid lines in FIG. 3. Preferably, piercing element 80 has a sufficient length to be projected into pressure vessel 10 far enough to penetrate the anticipated maximum thickness of gluey or sticky matrix material M that may block pressure relieving port 24.

Once the disk 32 and extract material M are breached by the piercing element 80 as described above with piercing element 80 in the extended position, a fluid pathway is opened to atmosphere. The captive $CO_2$ (or other gas or liquid that may alternatively be contained in the vessel) flows outwards from the pressure vessel 10 through the central axial passageway 63 of the hollow outer bolt 60 and is vented to atmosphere through the venting hole or holes 93 in the outer bolt and annular recess 23 in exterior surface 29 of the lid 22 (see dashed lines and gas flow arrows in FIG. 3). Advantageously, this relieves the bottled or captive pressure from the extraction pressure vessel 10 in a controlled manner. The user may increase the flow of escaping gas by rotating inner bolt 70 in a second rotational direction opposite the first direction until piercing element 80 is back in the retracted position as shown by the dashed lines in FIG. 3. The piercing element 80 now is positioned to provide the least obstruction possible to flow in central passageway 63 and reduced diameter portion 95 of pressure relieving port 24.

The end lid 22 may then be safely removed from the pressure vessel 10 once it is depressurized and the extract material M can then be removed from the vessel. The opposite outlet port lid 11 may be removed instead of or in addition to end lid 22 to access the extract material M.

It can be appreciated that when a high pressure vessel 10 is used with a pressure relief system 20 according to embodiments of the present invention described herein, and all inlet and outlet ports 13, 14 of the vessel are blocked by extract material M as explained above in the "Background," there advantageously is now a means of venting the vessel under controlled conditions. The inner bolt 70 with piercing element 80 is advanced into the rupture disk assembly 30 until the disk 32 bursts or ruptures. When the disk 32 is penetrated or bursts, the high pressure gas and likely a portion of the gluey extract blow out the vent passages of the bolt assembly

50. If the extract once again seals the pressure relieving port 24 before pressure is fully relieved, the piercing element 80 can be retracted and advanced repeatedly into the vessel 10 again thereby opening the port a second, third, or more times as needed. After the vessel has been vented using the invention it is then safe to open the vessel by unscrewing the lid 22.

The pressure relief system according to the present invention advantageously allows the rupture disk assembly 30 to be readily replaced after use. The outer bolt 60 with or without the inner bolt 70 still inserted therein is unscrewed and removed from the end lid 22. The ruptured disk assembly 30 is then removed from the pressure relieving port 24 of the lid 22 to replace the expended rupture disk. A new rupture disk 32 may then inserted between the inner and outer supporting members 37, 36 of the assembly. The disk assembly 30 is then inserted back into the pressure relieving port 24 followed by the outer bolt 60 which is screwed back into the lid 22 until it engages and compresses the disk assembly. The pressure relief system 20 is now ready for use again when needed.

Although exemplary embodiments of the present invention have been described in relation to pressure vessels used in supercritical fluid extraction applications, it will be appreciated that the present invention has broader applicability. Embodiments of the present pressure relief system may therefore be used with similar benefit in applications in other fields that use vessels containing high pressure fluids or gases. Accordingly, the present invention is not limited to fluid extraction applications alone.

Although a pressure relief system according to the present invention is shown mounted in a removable end lid of the pressure vessel, it will be appreciated that the bolt and rupture disk assemblies 50, 30 may instead be disposed in other portions or various appurtenances associated with the pressure vessel. Accordingly, in some other embodiments for example, without limitation, the bolt and rupture disk assemblies may be located directly in the circumferential sidewalls 26 of the vessel so long as the sidewalls are provided with sufficient thickness to accommodate these assemblies. Alternatively, for pressure vessels that may not have readily removable end lids, such as larger vessels, the bolt and rupture disk assemblies may be disposed in flanged piping connections in which a blind flange or plate configured similarly to the end lid 22 shown in FIGS. 2 and 3 is instead bolted onto a flange attached via a short piping stub or nipple to the pressure vessel. In either of these alternative mounting scenarios, the bolt and rupture disk assemblies 50, 30 would appear the same and be operated in an identical manner as already described and shown herein. It is well within the ambit of those skilled in the art to make and use such alternative mounting locations for the bolt and rupture disk assemblies without further description or undue experimentation based on the present disclosure. It will further be appreciated that the bolt and rupture disk assemblies may be made of any suitable size and will depend on the size of the pressure vessel involved so that gas or fluid inside may be exhausted at a suitable flow rate and pressure reduced within a reasonable time period to allow access to the vessel.

Accordingly, pressure relieving port 24 for mounting bolt assembly 50 and rupture disk assembly 30 may be formed in any suitably configured planar or curved pressure vessel substructure (e.g. end lid, sidewall, blind flange, or similar) so long as the substructure has sufficient thickness to support and dimensionally accommodate these appurtenances.

It will be understood that while the invention has been described in conjunction with specific embodiments thereof, the foregoing description and examples are intended to illustrate, but not limit the scope of the invention. Other aspects, advantages and modifications will be apparent to those skilled in the art to which the invention pertains, and these aspects and modifications are within the scope of the invention and described and claimed herein.

What is claimed is:

1. A pressure relief system for depressurizing a pressure vessel comprising:
   a pressure vessel having a removable rupture disk disposed inside a pressure relieving fluid port extending through the vessel from an interior surface to an opposing exterior surface;
   an elongated outer member having, an axial central passageway extending between proximal and distal ends, the outer member inserted at least partially inside the fluid port;
   an elongated inner puncturing member at least partially disposed in and movably supported by the outer member, the inner puncturing member rotatably coupled to the outer member and axially moveable with respect to the outer member via rotating the inner puncturing member;
   the inner puncturing member including an elongated piercing element at least partially disposed in the central passageway of the outer member, the piercing element having a tapered end configured for puncturing, the rupture disk, the piercing element being selectively projectable outwards from the distal end of the outer member and operable to puncture the rupture disk and project into the pressure vessel beyond the interior surface of the pressure vessel for clearing material deposits obstructing the port;
   wherein the outer member includes a cylindrical shank threadably engaged with the fluid port and the inner puncturing member includes a cylindrical, shank threadably engaged with the central passageway of the outer member.

2. The pressure relief system of claim 1, wherein the outer member and the inner puncturing member are concentrically aligned nested bolts.

3. The pressure relief system of claim 1, wherein the piercing element is axially movable via rotating the puncturing member between a retracted position spaced apart from the rupture disk and an extended position projecting through and puncturing the rupture disk.

4. The pressure relief system of claim 3, wherein the piercing element is fully contained within or partially projecting outwards from the central passageway of the outer member when in the retracted position.

5. The pressure relief system of claim 1, wherein the piercing element is further operable to be projected through the fluid port into an interior of the pressure vessel via rotating the puncturing member.

6. A pressure relief system for depressurizing a pressure vessel comprising:
   a pressure vessel having a removable rupture disk disposed inside a pressure relieving fluid port extending through the vessel from an interior surface to an opposing exterior surface;
   an elongated outer member having an axial central passageway extending between proximal and distal ends, the outer member inserted at least partially inside the fluid port;
   an elongated inner puncturing member at least partiality disposed in and movably supported by the outer member, the inner puncturing member rotatably coupled to the outer member and axially moveable with respect to the outer member via rotating the inner puncturing member;

the inner puncturing member including an elongated piercing element at least partially disposed in the central passageway of the outer member, the piercing element having a tapered end configured for puncturing rupture disk, the piercing being selectively projectable outwards from the distal end of the outer member and operable to puncture the rupture disk and project into the pressure vessel beyond the interior surface of the pressure vessel for clearing material deposits obstructing the port;

wherein the outer member includes at least one radially extending venting hole in fluid communication with the axial central passageway, the venting hole and central passageway defining a flow path for releasing pressure from the pressure vessel.

7. A pressure relief system for depressurizing a pressure vessel comprising:

a pressure vessel having a removable rupture disk disposed inside as pressure relieving fluid ort extending through the vessel from an interior surface to an opposing exterior surface;

an elongated outer member having an axial central passageway extending between proximal and distal ends, the outer member inserted at least partially inside the fluid port;

an elongated inner puncturing member at least partially disposed in and movably supported by the outer member, the inner puncturing member rotatably coupled to the outer member and axially moveable with respect to the outer member via rotating the inner puncturing member;

the inner puncturing member including an elongated piercing element at least partially disposed in the central passageway of the outer member, the piercing element having a tapered end configured for puncturing the rupture disk, the piercing element being selectively projectable outwards from the distal end of the outer member and operable to puncture the rupture disk and project into the pressure vessel beyond the interior surface of the pressure vessel for clearing material deposits obstructing the port;

wherein the rupture disk is disposed in an assembly between inner and outer supporting members located in the fluid port, the outer member having a distal end positioned in the fluid port and being operable to retain the rupture disk assembly in the fluid port.

8. The pressure relief system of claim 7, wherein the inner supporting member of the assembly defines an angled annular seat complementary configured to receive a corresponding angled seating flange formed on the rupture disk adjacent a domed shaped central portion.

9. The pressure relief system of claim 1, wherein the piercing element is a drill bit.

10. The pressure relief system of claim 1, wherein the fluid port is disposed in a removable lid mounted on the pressure vessel.

11. A pressure relief system for depressurizing a pressure vessel comprising:

a pressure vessel having a pressure relieving fluid port extending through the vessel from interior to exterior between an interior surface and an opposing exterior surface;

a removable rupture disk assembly disposed in the fluid port and including a rupture disk;

a hollow outer bolt having a shank threadably coupled to the fluid port the outer bolt defining an axial central passageway extending from a proximal end to a distal end of the outer bolt, the outer member inserted at least partially inside the fluid port;

an inner bolt having a shank threadably coupled to the central passageway of the outer bolt, the inner bolt being axially moveable with respect to the outer bolt via rotating the inner bolt; and an elongated piercing element protruding from the inner bolt and outwards from the distal end of the outer bolt, the piercing element at least partially disposed in the central passageway of the outer bolt, the piercing element having a tapered end configured for puncturing the rupture disk;

wherein the piercing element is axially movable via rotating, the inner bolt between a retracted position spaced apart from the rupture disk and an extended position projected through the fluid port into the interior of the pressure vessel, the puncturing element being operable to puncture the rupture disk and project into the pressure vessel beyond the interior surface of the pressure vessel for clearing material deposits obstructing the port by moving from the retracted position to the extended position.

12. The pressure relief system of claim 11, wherein the outer bolt includes at least one radially extending venting hole in fluid communication with the axial central passageway, the venting hole and central passageway defining a flow path through the fluid port for releasing pressure from the pressure vessel.

13. The pressure relief system of claim 11, wherein the rupture disk assembly includes inner and outer supporting members positioned on opposite sides of the rupture disk, the distal end of the outer bolt being operable to retain the rupture disk assembly in the fluid port.

14. The pressure relief system of claim 3, wherein the piercing element is fully contained, within or partially projecting outwards from the central passageway of the outer bolt when in the retracted position.

15. The pressure relief system of claim 11. wherein the distal end of the outer be engages and is operable to secure the rupture disk assembly in the fluid port.

16. The pressure relief system of claim 11, wherein the piercing element is a drill bit.

17. A method for depressurizing a pressure vessel, comprising:

mounting a nested bolt assembly to an elongated fluid port of a pressure vessel extending from an interior surface to an opposing exterior surface of the vessel, the bolt assembly including a first hollow outer bolt having an axial central passageway and a concentrically aligned second inner bolt partially inserted therein, the outer member inserted at least partially inside the fluid port;

axially advancing the inner bolt through the outer bolt;

puncturing a rupture disk disposed in the fluid port with an elongated piercing element mounted on the second bolt and protruding outwards from a distal end of the outer bolt;

projecting the piercing element through the fluid port into an interior of the pressure vessel after the step of puncturing the rupture disk, wherein the piercing element is operable to penetrate material deposits that may be formed in the pressure vessel obstructing the fluid port;

exhausting gas or liquid from the pressure vessel through the bolt assembly thereby reducing pressure within the pressure vessel.

18. The method of claim 17, wherein the inner bolt is threadably coupled to the outer bolt, the axially advancing step including rotating the inner bolt.

19. The method of claim 17, wherein the mounting step includes threadably coupling the outer bolt to the fluid port, the outer bolt having a shank extending into the fluid port.

20. The method of claim 17, further comprising a step of retaining the rupture disk in the fluid port with the outer bolt.

21. The method of claim 17, wherein the rupture disk is disposed in the fluid port between the pressure vessel interior and the piercing element.

22. The method of claim 17, wherein the outer bolt further includes at least one radially extending venting hole in fluid communication with the axial central passageway, the venting hole and central passageway defining a flow path.

23. A pressure relief system for depressurizing a pressure vessel comprising:
- a cylindrical pressure vessel having circumferential sidewalk and a removable lid coupled to one end of the pressure vessel
- a pressure relieving fluid port extending through the removable lid between an interior surface and an opposing exterior surface of the lid;
- a rupture disk disposed in the fluid port in the lid;
- a hollow outer holt having a shank threadably coupled to the fluid port, the outer bolt defining an axial central passageway extending from a proximal end to a distal end of the outer bolt, the outer member having a shank inserted inside the fluid port and threadably engaging the lid;
- an inner bolt having a shank threadably coupled to the central passageway of the outer bolt, the inner bolt being axially moveable with respect to the outer bolt via rotating the inner bolt; and
- an elongated piercing element protruding from the inner bolt and outwards from the distal end of the outer bolt, the piercing: element at least partially disposed in the central passageway of the outer bolt, the piercing element having a tapered end configured for puncturing the rupture disk;
- wherein the piercing element is axially movable via rotating the inner bolt between a retracted position spaced apart from the rupture disk and an extended position projected through the fluid on into the interior of the pressure vessel;
- wherein the puncturing element being operable to puncture the rupture disk and project into the pressure vessel beyond the interior surface of the pressure vessel for clearing material deposits obstructing the port by moving from the retracted position to the extended position.

* * * * *